(12) United States Patent
Ochiai et al.

(10) Patent No.: US 9,694,430 B2
(45) Date of Patent: Jul. 4, 2017

(54) WING SURFACE FINISHING METHOD AND WING COMPONENT

(71) Applicant: IHI Corporation, Koto-ku (JP)

(72) Inventors: Hiroyuki Ochiai, Tokyo (JP); Kengo Kuwahara, Tokyo (JP); Toshihisa Takekawa, Tokyo (JP)

(73) Assignee: IHI Corporation, Koto-ku (JP)

( * ) Notice: Subject to any disclaimer, the term of this patent is extended or adjusted under 35 U.S.C. 154(b) by 31 days.

(21) Appl. No.: 14/933,589

(22) Filed: Nov. 5, 2015

(65) Prior Publication Data

US 2016/0052071 A1 Feb. 25, 2016

Related U.S. Application Data

(63) Continuation of application No. PCT/JP2013/062995, filed on May 9, 2013.

(51) Int. Cl.
*B23C 3/18* (2006.01)
*B23C 5/10* (2006.01)

(52) U.S. Cl.
CPC .............. *B23C 3/18* (2013.01); *B23C 5/1081* (2013.01); *B23C 2215/44* (2013.01); *B23C 2220/04* (2013.01); *B23C 2220/28* (2013.01); *B23C 2220/32* (2013.01); *Y10T 409/30756* (2015.01); *Y10T 409/303808* (2015.01)

(58) Field of Classification Search
CPC .... B23C 3/02; B23C 3/04; B23C 3/16; B23C 3/18; B23C 2215/045; B23C 2215/04; B23C 2215/44; B23C 2220/28; Y10T 409/30756
See application file for complete search history.

(56) References Cited

U.S. PATENT DOCUMENTS 3,295,190 A * 1/1967 Parsons ..................... B23C 3/16
29/889.6
4,031,809 A 6/1977 Shraiman et al.
(Continued)

FOREIGN PATENT DOCUMENTS

CH 661678 A5 8/1987
CN 1413790 A 4/2003
(Continued)

OTHER PUBLICATIONS

ProQuest machine translation of CH 661678, printed Mar. 2017.*
(Continued)

*Primary Examiner* — Daniel Howell
(74) *Attorney, Agent, or Firm* — Oblon, McClelland, Maier & Neustadt, L.L.P.

(57) ABSTRACT

A wing surface finishing method is the one in which after finishing of a leading edge and a trailing edge and finishing of a ventral portion and a back portion in a wing surface of a wing component are separated into separate steps, a finishing end mill is made to approach a ventral portion and a back portion of awing surface corresponding area of a workpiece after a speed of the finishing end mill is increased, finishing processing is applied to the ventral portion and the back portion of the wing surface corresponding area of the workpiece, respectively, and the speed of the finishing end mill is decreased after the finishing end mill is moved away from the wing surface corresponding area of the workpiece.

2 Claims, 6 Drawing Sheets

(56) References Cited

U.S. PATENT DOCUMENTS

| | | | | |
|---|---|---|---|---|
| 5,733,080 | A | * 3/1998 | David | ............... B23C 3/18 29/889.23 |
| 6,491,482 | B1 | 12/2002 | Fenkl et al. | |
| 6,991,434 | B2 | * 1/2006 | Heinrich | ............... B23C 3/18 29/402.13 |
| 8,701,287 | B2 | * 4/2014 | Holze | ............... B23C 3/18 29/557 |
| 2007/0160706 | A1 | 7/2007 | Matsumoto | |

FOREIGN PATENT DOCUMENTS

| | | | | |
|---|---|---|---|---|
| CN | 1978107 A | 6/2007 | | |
| CN | 102950316 A | 3/2013 | | |
| DE | 19607192 A1 | 1/1997 | | |
| DE | 102010060220 B4 | * 7/2013 | ............... | B23C 3/18 |
| JP | 60197308 A | * 10/1985 | ............ | B23Q 35/00 |
| JP | 62225702 A | * 10/1987 | | |
| JP | 62264814 A | * 11/1987 | | |
| JP | 8-141815 A | 6/1996 | | |
| JP | 2000-233310 A | 8/2000 | | |
| JP | 2002-36020 A | 2/2002 | | |
| JP | 2003-165012 A | 6/2003 | | |
| JP | 4183058 B2 | 9/2008 | | |
| JP | 2013-103290 A | 5/2013 | | |
| SU | 1093433 A1 | * 5/1984 | | |
| WO | WO 0200389 A2 | * 1/2002 | ............ | G05B 19/41 |

OTHER PUBLICATIONS

EPO machine translation of CH 661678, printed Mar. 2017.*
International Search Report issued Jun. 11, 2013 for PCT/JP2013/062995 filed on May 9, 2013 with English Translation.
Written Opinion issued Jun. 11, 2013 for PCT/JP2013/062995 filed on May 9, 2013.
Japanese Office Action for JP 2011-247618 mailed Aug. 25, 2015 with English Translation.
Extended European Search Report issued Dec. 13, 2016 in Patent Application No. 13884227.3.
Combined Chinese Office Action and Search Report issued Nov. 3, 2016 in Chinese Patent Application No. 201380076345.9 (with English translation of Category of Cited Documents).

* cited by examiner

US 9,694,430 B2

WING SURFACE FINISHING METHOD AND WING COMPONENT

CROSS REFERENCE TO RELATED APPLICATIONS

This application is a continuation application of International Application No. PCT/JP2013/062995, filed on May 9, 2013, the entire contents of which are incorporated by reference herein.

BACKGROUND

1. Field

The present disclosure relates to a wing surface finishing method etc. for applying finishing processing to a wing surface corresponding area of a roughly-processed workpiece, and finishing it into a wing surface of a wing member.

2. Description of the Related Art

Generally, wing members used for a compressor or a turbine of a gas turbine can be classified into a single wing component, and a wing wheel component member of an integrated wing wheel (a blisk). Additionally, the wing component and a wing surface of the wing wheel component member as the wing members are usually finished as follows by applying finishing processing to a wing surface corresponding area of a roughly-processed workpiece.

As shown in FIGS. 5A and 5B, a finishing end mill 10 is given infeed in an axial direction thereof, and is fed and moved relatively to a workpiece W1 along an outer peripheral direction of a wing surface corresponding area P1 of the workpiece W1, while being rotated around an axial center 10c thereof in a state where a tip of the finishing end mill 10 is made to face the wing surface corresponding area P1 of the workpiece W1. As a result, finishing processing is applied to the wing surface corresponding area P1 of the workpiece W1 by a shoulder of the tip of the finishing end mill 10. Further, finishing processing is applied to the wing surface corresponding area P1 of the workpiece W1 repeatedly a plurality of times by the shoulder of the tip of the finishing end mill 10, while giving to the finishing end mill 10 pitch feed in a spanwise direction (a longitudinal direction) of the wing surface corresponding area P1 of the workpiece W1. As a result of this, the wing surface corresponding area P1 of the workpiece W1 can be finished into a wing surface S1 of a wing component M1 as a wing member.

Similarly, as shown in FIGS. 6A and 6B, a finishing end mill 20 is given infeed in a radial direction thereof, and is fed and moved relatively to a workpiece W2 along an outer peripheral direction of a wing surface corresponding area P2 of the workpiece W2, while being rotated around an axial center 20c thereof in a state where a tip of the finishing end mill 20 is directed to a base end side of the wing surface corresponding area P2 of the workpiece W2. As a result, finishing processing is applied to the wing surface corresponding area P2 of the workpiece W2 by a shoulder of the tip of the finishing end mill 20. Further, finishing processing is applied repeatedly a plurality of times to an outer peripheral portion of the wing surface corresponding area P2 of the workpiece W2 by the shoulder of the tip of the finishing end mill 20, while giving to the finishing end mill 20 pitch feed in a spanwise direction of the wing surface corresponding area P2 of the workpiece W2. As a result of this, the wing surface corresponding area P2 of the workpiece W2 can be finished into a wing surface S2 of a wing wheel component member M2 as a wing member.

SUMMARY

By the way, in recent years, an attempt to increase a cutting speed of an end mill, while suppressing occurrence of excessive rise in temperature of the end mill, by reducing a contact length of a workpiece and the end mill by means of a reduced diameter of the end mill, i.e., an attempt to apply a high-speed cutting technology has been made. Meanwhile, when the high-speed cutting technology is applied to finishing of the wing surface S1 (S2) of the wing member M1 (M2) in order to improve productivity, a relative feed-movement speed of a finishing end mill 10A (20A) becomes higher along with increase in a cutting speed of the finishing end mill 10A (20A) with a small diameter, and a relative speed of the finishing end mill 10A (20A) becomes lower due to decrease in speed for change in direction near a leading edge P1a (P2a) or a trailing edge P1t (P2t) of the wing surface corresponding area P1 (P2) of the workpiece W1 (W2), thereby causing decrease in a relative feed amount per cutting edge of the finishing end mill 10A (20A). Therefore, large frictional heat is easily generated in the finishing end mill 10A (20A) due to slipping between the finishing end mill 10A (20A) and the workpiece W1 (W2), which causes deterioration of durability of the finishing end mill 10A (20A). That is, there is a problem that it is difficult to maintain the durability of the finishing end mill 10A (20A), while improving the productivity of finishing of the wing surface S1 (S2) of the wing member M1 (M2).

Consequently, an object of the present disclosure is to provide a wing surface finishing method etc. that can solve the above-mentioned problem.

A first aspect of the present disclosure is a wing surface finishing method for applying finishing processing to a wing surface corresponding area of a roughly-processed workpiece, and finishing it into a wing surface of a wing member, the wing surface finishing method including: a first finishing step of applying finishing processing to a leading edge and a trailing edge of the wing surface corresponding area of the workpiece, and finishing the leading edge and trailing edge of the wing surface corresponding area of the workpiece into a leading edge and a trailing edge of the wing surface of the wing member, by giving infeed to a finishing end mill, and feeding and moving the finishing end mill relatively to the workpiece along the leading edge and the trailing edge of the wing surface corresponding area of the workpiece, while rotating the finishing end mill around an axial center thereof; a second finishing step of applying finishing processing only to one of a ventral portion and a back portion of the wing surface corresponding area of the workpiece, and decreasing a speed of the finishing end mill after moving the finishing end mill away from the wing surface corresponding area of the workpiece, by giving infeed to the finishing end mill, making the finishing end mill approach the workpiece after increasing the speed of the finishing end mill, and feeding and moving the finishing end mill relatively to the workpiece along the one of the ventral portion and the back portion from a leading edge side or a trailing edge side of the wing surface corresponding area of the workpiece, while rotating the finishing end mill around the axial center thereof; a third finishing step of applying finishing processing only to the other of the ventral portion and the back portion of the wing surface corresponding area of the workpiece, and decreasing the speed of the finishing end mill after moving the finishing end mill away from the wing surface corresponding area of the workpiece, by giving infeed to the finishing end mill, making the finishing end mill approach the workpiece after increasing the speed of the finishing end mill, and feeding and moving the finishing end mill relatively to the workpiece along the other of the ventral portion and the back portion from the trailing edge side or the leading edge side of the wing surface corresponding area of the workpiece, while rotating the finishing end mill around the axial center thereof, after end of the second finishing step; and a fourth finishing step of finishing the ventral portion and the back portion of the wing surface corresponding area of the workpiece into a ventral portion and a back portion of the wing surface of the wing member, by alternately repeatedly executing the second finishing step and the third finishing step while giving to the finishing end mill pitch feed in a spanwise direction of the wing surface corresponding area of the workpiece, after end of the third finishing step.

Note that the spanwise direction of the wing surface corresponding area of the workpiece means a direction from a tip toward a base end of the wing surface corresponding area of the workpiece.

A second aspect of the present disclosure is a wing component including the wing surface finished by the above-described wing surface finishing method.

According to the present disclosure, even if a relative feed-movement speed of the finishing end mill becomes higher along with increase in a cutting speed of the finishing end mill, decrease in a relative feed amount per cutting edge of the finishing end mill near the leading edge or the trailing edge of the wing surface corresponding area of the workpiece can be suppressed. Therefore, large frictional heat can be suppressed from being generated between the finishing end mill and the workpiece to thereby maintain durability of the finishing end mill, while improving productivity of finishing of the wing surface of the wing member.

DESCRIPTION OF THE EMBODIMENTS

First Embodiment

A first embodiment of the present disclosure will be explained with reference to FIGS. 1A, 1B, 2A and 2B.

As shown in FIGS. 1A to 2B, a wing surface finishing method according to the embodiment is the method for applying finishing processing to a wing surface corresponding area P1 of a roughly-processed workpiece W1 set to a work jig (not shown) of a machining center, and finishing it into a wing surface S1 of a wing component M1 as a wing member. In addition, in the wing surface finishing method according to the embodiment, the wing surface corresponding area P1 of the workpiece W1 is divided into a plurality of (three in the first embodiment) sections L1A, L1B, and L1C from a tip to a base end, and a series of steps including a first finishing step (1-1), a second finishing step (1-2), a third finishing step (1-3), and a fourth finishing step (1-4) is sequentially executed from a tip side in the plurality of sections L1A, L1B, and L1C. Note that execution of each step in the section L1B is shown in FIGS. 1A to 2B.

Figure 6A:
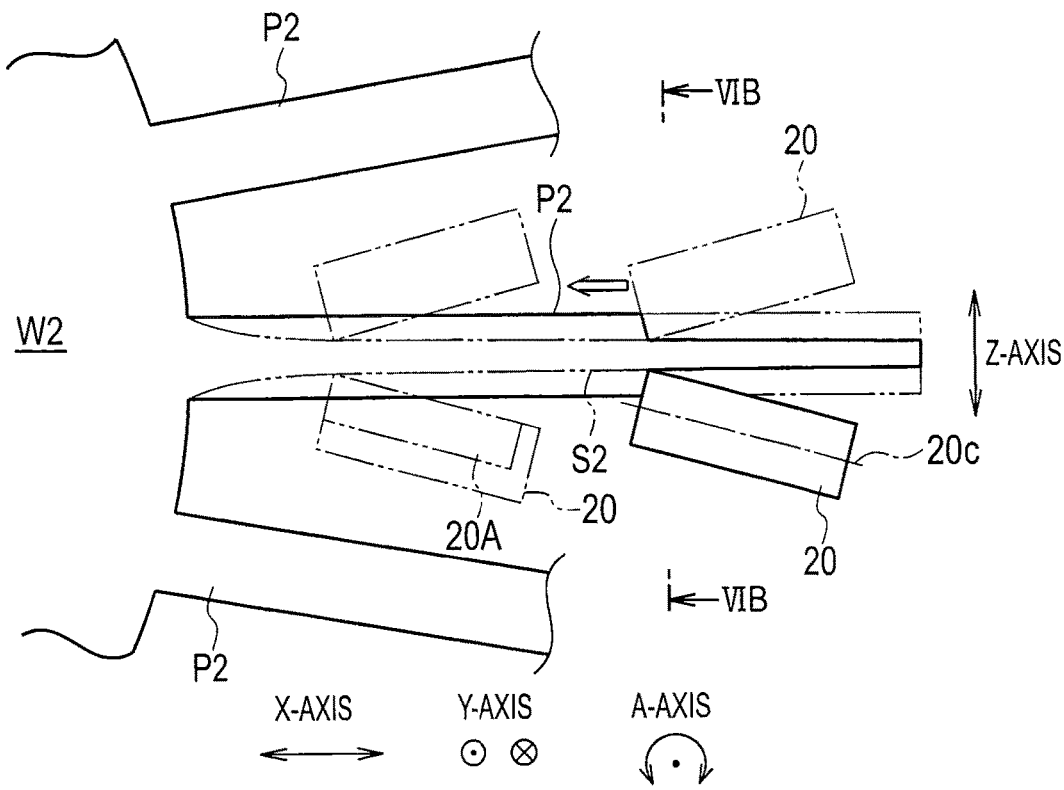
FIG. 6A is a schematic view illustrating a conventional technique of finishing a wing surface corresponding area (a leading edge and a trailing edge are included) of a workpiece into a wing surface of a wing wheel component member.
Figure 6B:
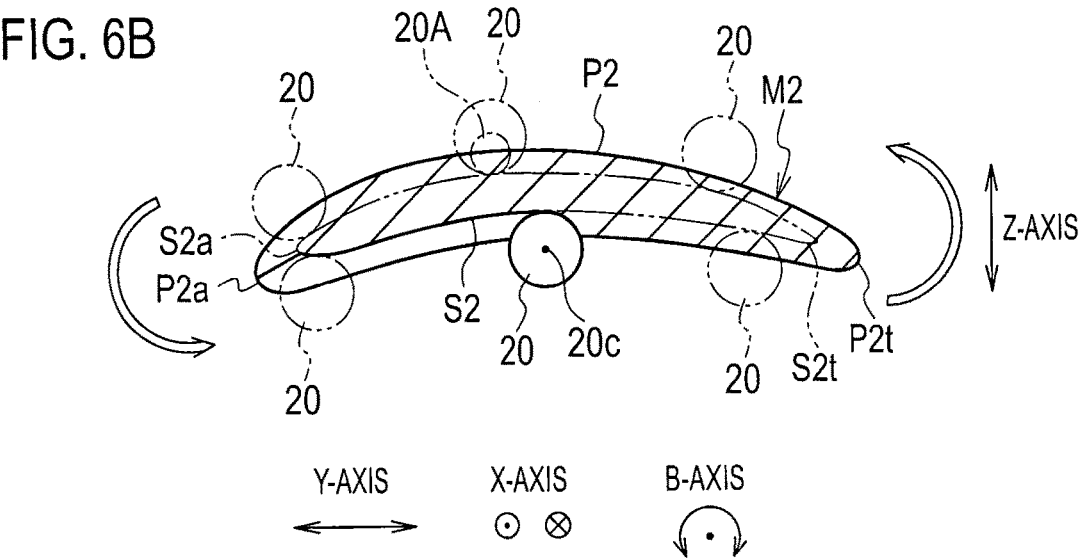
FIG. 6B is a view along a line VIB-VIB in FIG. 6A.

The wing surface finishing method according to the embodiment uses a finishing end mill 30 that is mounted on a spindle (not shown) of the machining center, and that has a diameter smaller than an outer diameter of a finishing end mill 10 (refer to FIGS. 6A and 6B). Here, although the finishing end mill 30 rotates around an axial center 30c by drive of a rotary motor (not shown) of the machining center, feed-movement control and feed-rotation control of the finishing end mill 30 are performed relatively to the workpiece W1 in feed-movement axis directions and feed-rotation axis directions. In addition, in the first embodiment, although the finishing end mill 30 is a radius end mill, it may be a ball end mill. Note that in the first embodiment, the feed-movement axis directions mean an X-axis direction, a Y-axis direction, and a Z-axis direction perpendicular to each other, and that the feed-rotation axis directions mean an A-axis direction, which is the direction to rotate around an axial center parallel to the Y-axis direction, and a B-axis direction, which is the direction to rotate around an axial center parallel to the X-axis direction.

Subsequently, specific contents of each step in the wing surface finishing method according to the embodiment will be explained.

(First Finishing Step (1-1))

Figure 1A:
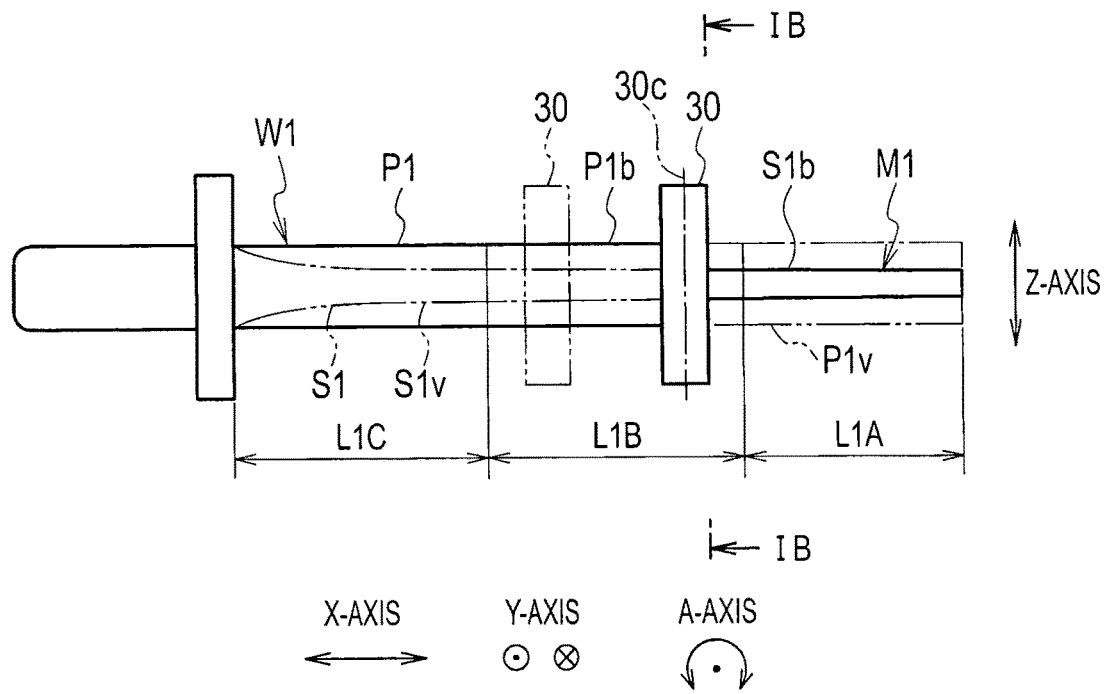
FIG. 1A is a schematic view illustrating a first finishing step in a wing surface finishing method according to a first embodiment of the present disclosure, which shows applying finishing processing to a leading edge and a trailing edge of a wing surface corresponding area.
Figure 1B:
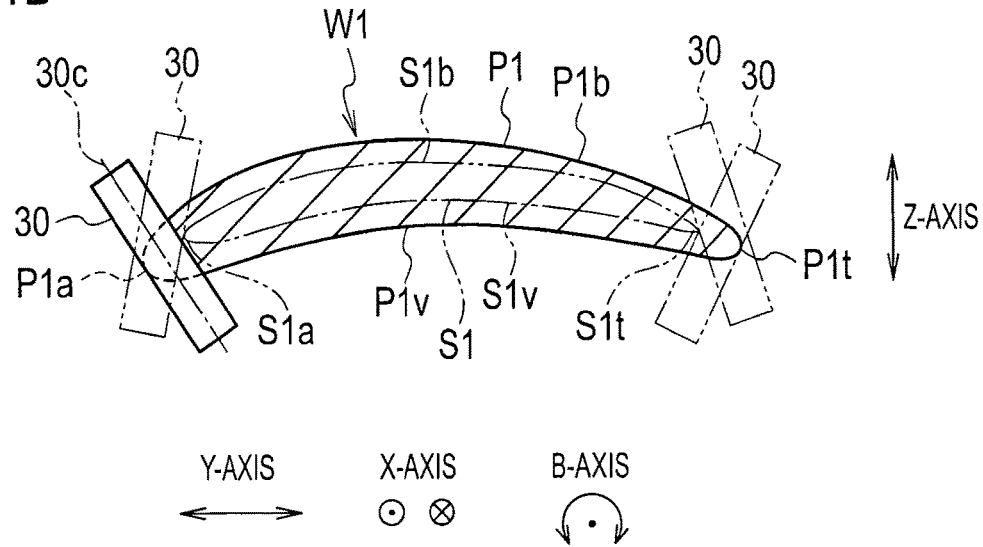
FIG. 1B is a view along a line IB-IB in FIG. 1A.

As shown in FIGS. 1A and 1B, the finishing end mill 30 is given infeed in a radial direction thereof, and is fed and moved repeatedly a plurality of times to the workpiece W1 along a leading edge P1a of the wing surface corresponding area P1 of the workpiece W1, while being rotated around the axial center 30c in a state where the axial center 30c of the finishing end mill 30 is crossed in a spanwise direction of the wing surface corresponding area P1 of the workpiece W1, by driving a rotary motor, and performing feed-movement control and feed-rotation control of the finishing end mill 30 with respect to the workpiece W1 in the feed-movement axis directions and the feed-rotation axis directions. As a result of this, for each section L1A (L1B, L1C), finishing processing is applied to the leading edge P1a of the wing surface corresponding area P1 of the workpiece W1 by an outer peripheral portion (an outer peripheral cutting edge) of the finishing end mill 30, and the leading edge P1a of the wing surface corresponding area P1 of the workpiece W1 is finished into a leading edge S1a of the wing surface S1 of the wing component M1.

Similarly, as shown in FIGS. 1A and 1B, the finishing end mill 30 is given infeed in the axial direction thereof, and is fed and moved repeatedly a plurality of times to the workpiece W1 along a trailing edge P1t of the wing surface corresponding area P1 of the workpiece W1, while being rotated around the axial center 30c in the state where the axial center 30c of the finishing end mill 30 is crossed in the spanwise direction of the wing surface corresponding area P1 of the workpiece W1. As a result of this, for each section L1A (L1B, L1C), finishing processing is applied to the trailing edge P1t of the wing surface corresponding area P1 of the workpiece W1 by the outer peripheral portion of the finishing end mill 30, and the trailing edge P1t of the wing surface corresponding area P1 of the workpiece W1 is finished into a trailing edge S1t of the wing surface S1 of the wing component M1.

(Second Finishing Step (1-2))

Figure 2A:
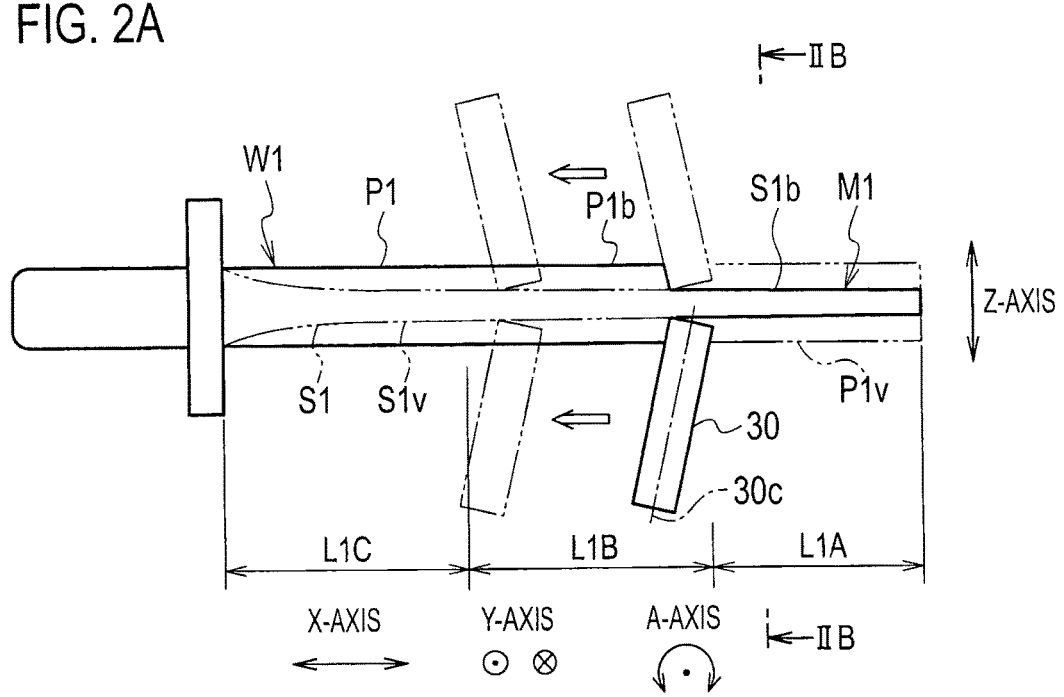
FIG. 2A is a schematic view illustrating a second finishing step and a third finishing step in the wing surface finishing method according to the first embodiment of the present disclosure, which shows applying finishing processing to a ventral portion and a back portion of the wing surface corresponding area.
Figure 2B:
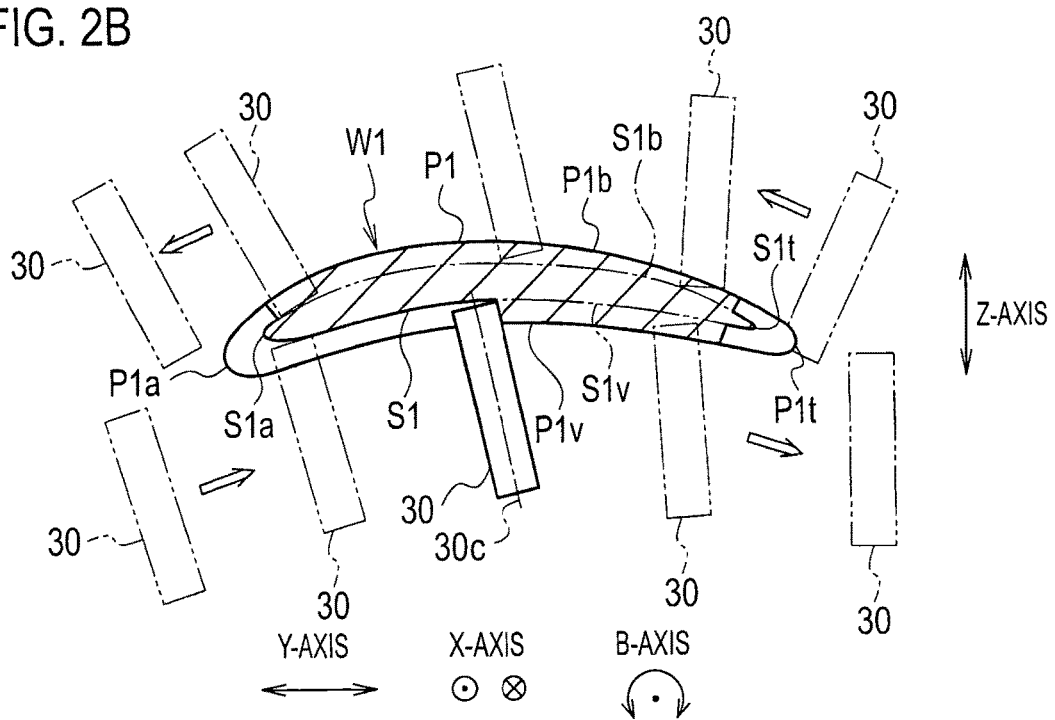
FIG. 2B is a view along a line IIB-IIB in FIG. 2A.

After end of the first finishing step (1-1), as shown in FIGS. 2A and 2B, the finishing end mill 30 is given infeed in an axial direction thereof, is made to approach the workpiece W1 after a speed thereof is increased, and is fed and moved relatively to the workpiece W1 along a ventral portion P1v from a leading edge P1a side (or a trailing edge P1t side) of the wing surface corresponding area P1 of the workpiece W1, while being rotated around the axial center 30c thereof in a state where a tip of the finishing end mill 30 is made to face the wing surface corresponding area P1 of the workpiece W1, by driving the rotary motor, and performing feed-movement control and feed-rotation control of the finishing end mill 30 with respect to the workpiece W1 in the feed-movement axis directions and the feed-rotation axis directions. At this time, finishing processing is applied only to the ventral portion P1v of the wing surface corresponding area P1 of the workpiece W1 by a shoulder of the tip of the finishing end mill 30, and the speed of the finishing end mill 30 is decreased after the finishing end mill 30 is moved away from the wing surface corresponding area P1 of the workpiece W1.

(Third Finishing Step (1-3))

After end of the second finishing step (1-2), as shown in FIGS. 2A and 2B, the finishing end mill 30 is given infeed in the axial direction thereof, is made to approach the workpiece W1 after the speed thereof is increased, and is fed and moved relatively to the workpiece W1 along a back portion P1b from the trailing edge P1t side (or the leading edge P1a side) of the wing surface corresponding area P1 of the workpiece W1, while being rotated around the axial center 30c thereof in the state where the tip of the finishing end mill 30 is made to face the wing surface corresponding area P1 of the workpiece W1, by driving the rotary motor, and performing feed-movement control and feed-rotation control of the finishing end mill 30 with respect to the workpiece W1 in the feed-movement axis directions and the feed-rotation axis directions. At this time, finishing processing is applied only to the back portion P1b of the wing surface corresponding area P1 of the workpiece W1 by the shoulder of the tip of the finishing end mill 30, and the speed of the finishing end mill 30 is decreased after the finishing end mill 30 is moved away from the wing surface corresponding area P1 of the workpiece W1.

(Fourth Finishing Step (1-4))

After end of the third finishing step (1-3), processing of the second finishing step (1-2) and the third finishing step (1-3) is alternately repeated, while giving to the finishing end mill 30 pitch feed in the spanwise direction (a longitudinal direction) of the wing surface corresponding area P1 of the workpiece W1, by driving the rotary motor, and performing feed-movement control and feed-rotation control of the finishing end mill 30 with respect to the workpiece W1 in the feed-movement axis directions and the feed-rotation axis directions. As a result of this, for each section L1A (L1B, L1C), the ventral portion P1v and the back portion P1b of the wing surface corresponding area P1 of the workpiece W1 can be finished into a ventral portion S1v and a back portion S1b of the wing surface S1 of the wing component M1.

Note that instead of applying finishing processing to the ventral portion P1v of the wing surface corresponding area P1 of the workpiece W1 in the second finishing step (1-2), and applying finishing processing to the back portion P1b of the wing surface corresponding area P1 of the workpiece W1 in the third finishing step (1-3), finishing processing may be applied to the back portion P1b of the wing surface corresponding area P1 of the workpiece W1 in the second finishing step (1-2), and finishing processing may be applied to the ventral portion P1v of the wing surface corresponding area P1 of the workpiece W1 in the third finishing step (1-3).

Subsequently, actions and effects of the embodiment will be explained.

After finishing of the leading edge S1a and the trailing edge S1t and finishing of the ventral portion S1v and the back portion S1b in the wing surface S1 of the wing component M1 are separated into separate steps, finishing processing is applied to the ventral portion P1v and the back portion P1b of the wing surface corresponding area P1 of the workpiece W1, respectively, and increasing and decreasing the speed of the finishing end mill 30 are performed while the finishing end mill 30 is away from the wing surface corresponding area P1 of the workpiece W1. Therefore, even if a relative feed-movement speed of the finishing end mill 30 becomes higher along with increase in a cutting speed of the finishing end mill 30, decrease in a relative feed amount per cutting edge due to change in direction of the finishing end mill 30 can be suppressed near the leading edge P1a and a trailing edge P1t of the wing surface corresponding area P1 of the workpiece W1.

In addition, the wing surface corresponding area P1 of the workpiece W1 is divided into the plurality of sections L1A, L1B, and L1C from the tip to the base end, and the series of steps including the first finishing step (1-1), the second finishing step (1-2), the third finishing step (1-3), and the fourth finishing step (1-4) is executed for each section L1A (L1B, L1C). Therefore, rapid deterioration of rigidity of the wing surface corresponding area P1 of the workpiece W1 in the middle of performing finishing processing thereof can be suppressed.

Accordingly, according to the embodiment, even if the relative feed-movement speed of the finishing end mill 30 becomes higher along with increase in the cutting speed of the finishing end mill 30, decrease in the relative feed amount per cutting edge of the finishing end mill 30 near the leading edge P1a and the trailing edge P1t of the wing surface corresponding area P1 of the workpiece W1 can be suppressed. Therefore, large frictional heat can be suppressed from being generated between the finishing end mill 30 and the workpiece W1 to thereby maintain durability of the finishing end mill 30, while improving productivity of finishing of the wing surface S1 of the wing component M1.

In addition, since rapid deterioration of the rigidity of the wing surface corresponding area P1 of the workpiece W1 in the middle of performing finishing processing thereof can be suppressed, chattering of the workpiece W1 can be reduced, and finishing accuracy of the wing surface S1 of the wing component M1 can be improved.

Second Embodiment

A second embodiment of the present disclosure will be explained with reference to FIGS. 3A, 3B, 4A, and 4B.

As shown in FIGS. 3A to 4B, a wing surface finishing method according to the embodiment is the method for applying finishing processing to a wing surface corresponding area P2 of a roughly-processed workpiece W2 set to a work jig (not shown) of a machining center, and finishing the wing surface corresponding area P2 of the workpiece W2 into a wing surface S2 of a wing wheel component member M2 as a wing member. In addition, in the wing surface finishing method according to the embodiment, the wing surface corresponding area P2 of the workpiece W2 is divided into a plurality of (three in the second embodiment) sections L2A, L2B, and L2C from a tip to a base end, and a series of steps including a first finishing step (2-1), a second finishing step (2-2), a third finishing step (2-3), and a fourth finishing step (2-4) is sequentially executed from a tip side in the plurality of sections L2A, L2B, and L2C. Note that execution of each step in the section L2B is shown in FIGS. 3A to 4B.

The wing surface finishing method according to the embodiment uses a finishing end mill 40 that is mounted on a spindle (not shown) of the machining center, and that has a diameter smaller than an outer diameter of the finishing end mill 20 (refer to FIGS. 6A and 6B). In addition, the finishing end mill 40 may be a radius end mill or a ball end mill. Here, although the finishing end mill 40 rotates around an axial center 40c by drive of a rotary motor (not shown) of the machining center, feed-movement control and feed-rotation control of the finishing end mill 40 are performed relatively to the workpiece W2 in the feed-movement axis directions (the X-axis direction, the Y-axis direction, and the Z-axis direction) and the feed-rotation axis directions (the A-axis direction and the B-axis direction).

Subsequently, specific contents of each step in the wing surface finishing method according to the embodiment will be explained.

(First Finishing Step (2-1))

Figure 3A:
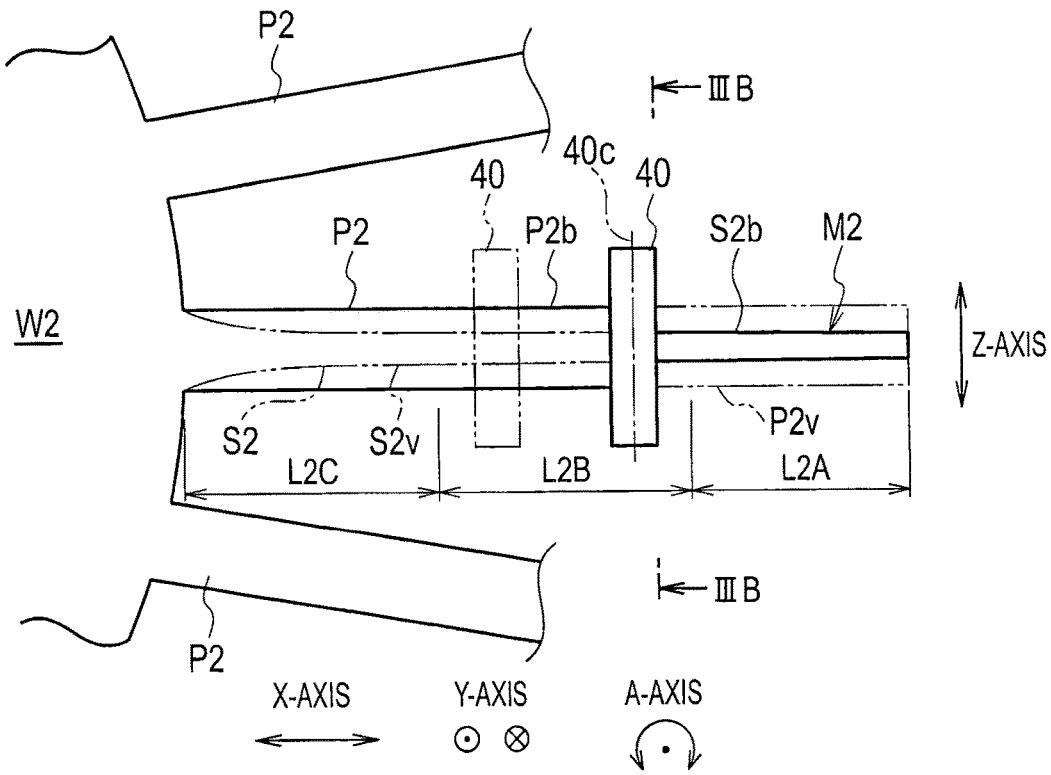
FIG. 3A is a schematic view illustrating a first finishing step in a wing surface finishing method according to a second embodiment of the present disclosure, which shows applying finishing processing to a leading edge and a trailing edge of a wing surface corresponding area.
Figure 3B:
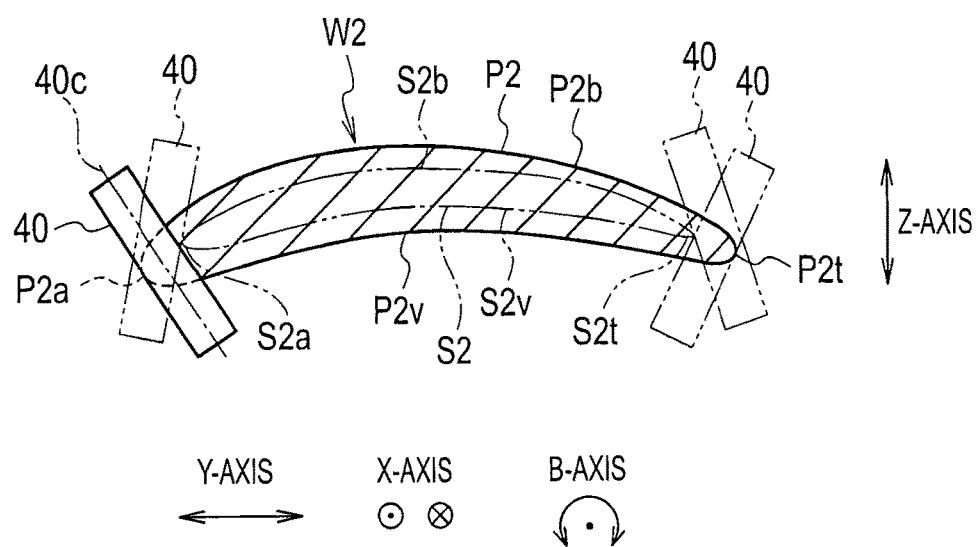
FIG. 3B is a view along a line IIIB-IIIB in FIG. 3A.

As shown in FIGS. 3A and 3B, similarly to the first finishing step (1-1) in the wing surface finishing method according to the first embodiment of the present disclosure, by executing the first finishing step (2-1), for each section L2A (L2B, L2C) of the wing surface corresponding area P2 of the workpiece W2, finishing processing is applied to a leading edge P2a and a trailing edge P2t of the wing surface corresponding area P2 of the workpiece W2 by an outer peripheral portion (an outer peripheral cutting edge) of the finishing end mill 40, and the leading edge P2a and the trailing edge P2t of the wing surface corresponding area P2 of the workpiece W2 are finished into a leading edge S2a and a trailing edge S2t of the wing surface S2 of the wing wheel component member M2.

(Second Finishing Step (2-2))

Figure 4A:
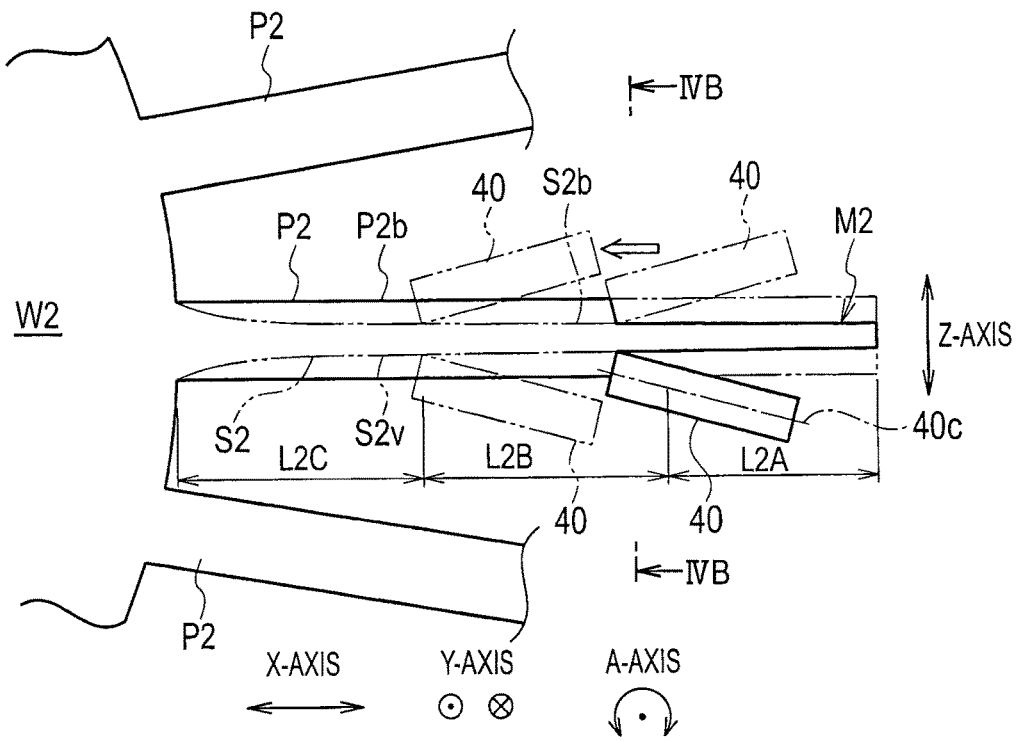
FIG. 4A is a schematic view illustrating a second finishing step and a third finishing step in the wing surface finishing method according to the second embodiment of the present disclosure, which shows applying finishing processing to a ventral portion and a back portion of the wing surface corresponding area.
Figure 4B:
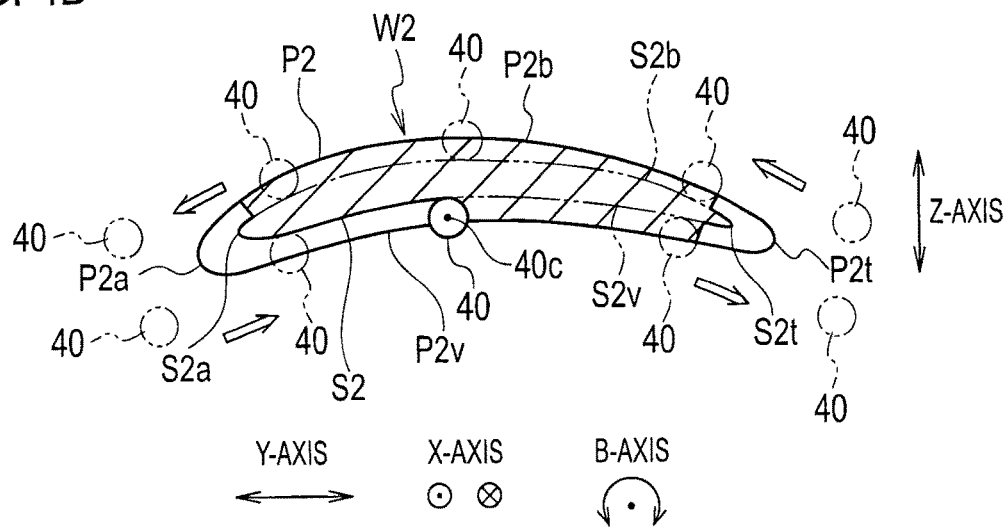
FIG. 4B is a view along a line IVB-IVB in FIG. 4A.
Figure 5A:
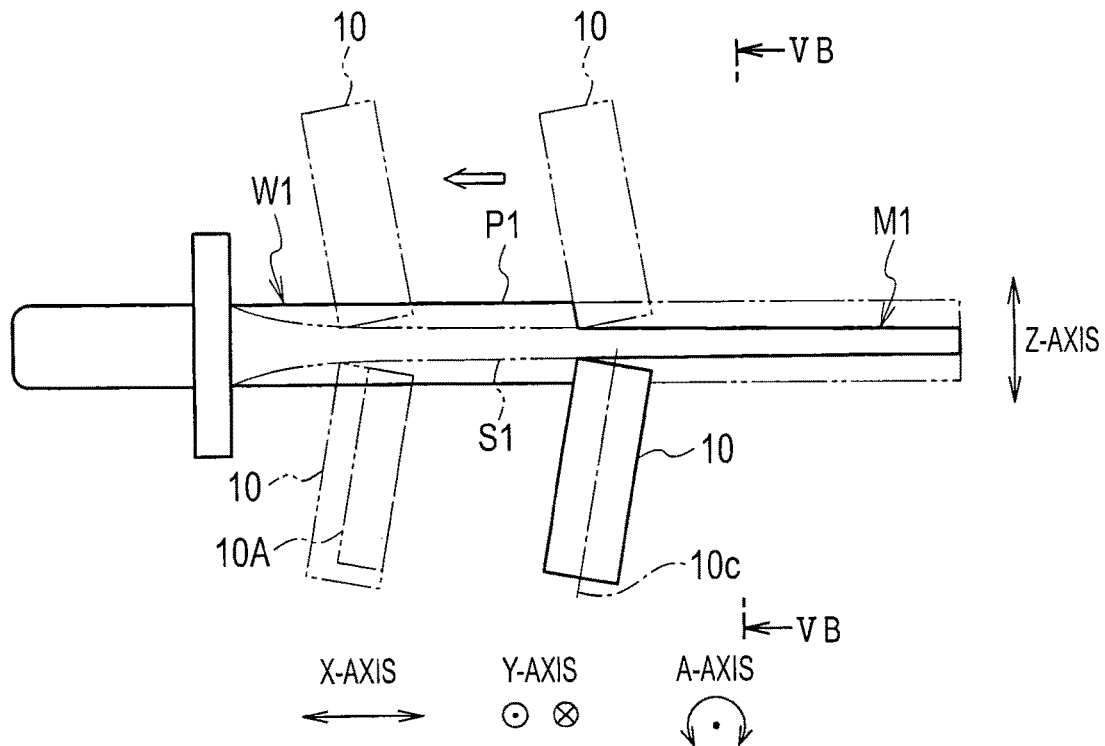
FIG. 5A is a schematic view illustrating a conventional technique of finishing a wing surface corresponding area (a leading edge and a trailing edge are included) of a workpiece into a wing surface of a wing component.
Figure 5B:
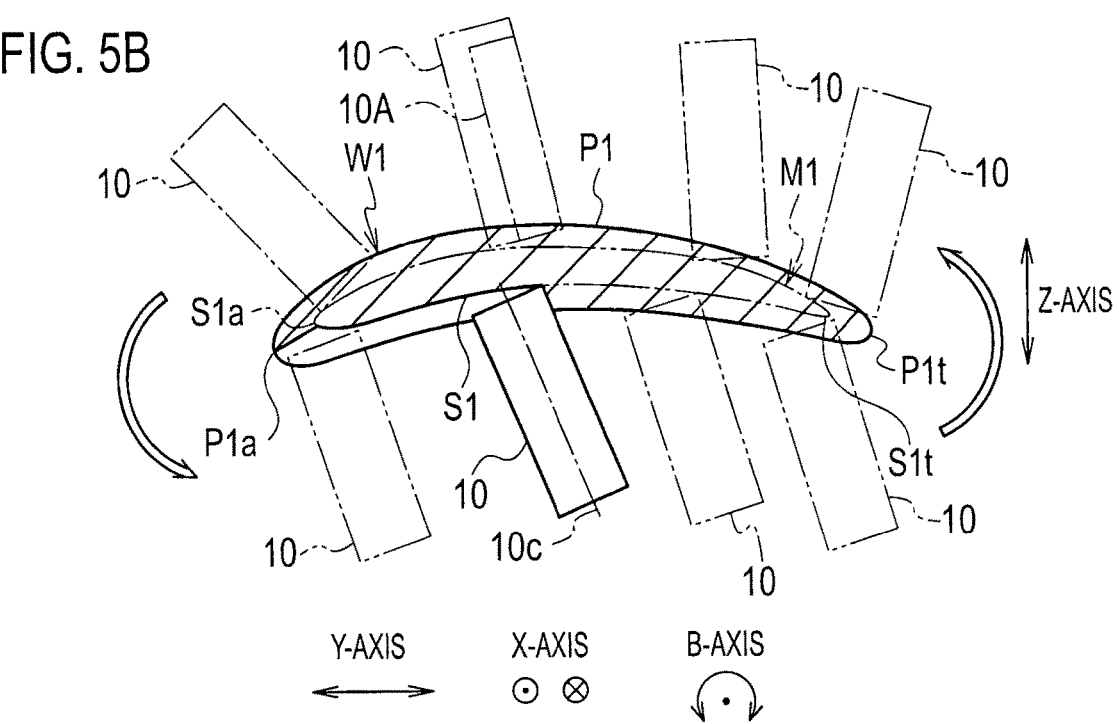
FIG. 5B is a view along a line VB-VB in FIG. 5A.

After end of the first finishing step (2-1), as shown in FIGS. 4A and 4B, the finishing end mill 40 is given infeed in a radial direction thereof, is made to approach the workpiece W2 after a speed thereof is increased, and is fed and moved relatively to the workpiece W2 along a ventral portion P2v from a leading edge P2a side (or a trailing edge P2t side) of the wing surface corresponding area P2 of the workpiece W2, in a state where a tip of the finishing end mill 40 is directed to a base end side of the wing surface corresponding area P2 of the workpiece W2 (i.e., a state where the finishing end mill 40 is located along the wing surface corresponding area P2 of the workpiece W2), by driving the rotary motor, and performing feed-movement control and feed-rotation control of the finishing end mill 40 with respect to the workpiece W2 in the feed-movement axis directions and the feed-rotation axis directions. At this time, finishing processing is applied only to the ventral portion P2v of the wing surface corresponding area P2 of the workpiece W2 by a shoulder of the tip of the finishing end mill 40, and the finishing end mill 40 is moved away from the wing surface corresponding area P2 of the workpiece W2.

Note that a reason that the tip of the finishing end mill 40 is made to be in the state of being directed to the base end side of the wing surface corresponding area P2 of the workpiece W2 is to prevent the finishing end mill 40 form interfering with another wing surface corresponding area P2 adjacent to the unfinished wing surface corresponding area P2.

(Third Finishing Step (2-3))

After end of the second finishing step (2-2), as shown in FIGS. 4A and 4B, the finishing end mill 40 is given infeed in the radial direction thereof, is made to approach the workpiece W2 after the speed thereof is increased, and is fed and moved relatively to the workpiece W2 along a back portion P2b from the trailing edge P2t side (or the leading edge P2a side) of the wing surface corresponding area P2 of the workpiece W2, in the state where the tip of the finishing end mill 40 is directed to the base end side of the wing surface corresponding area P2 of the workpiece W2, by driving the rotary motor, and performing feed-movement control and feed-rotation control of the finishing end mill 40 with respect to the workpiece W2 in the feed-movement axis directions and the feed-rotation axis directions. Finishing processing is applied only to the back portion P2b of the wing surface corresponding area P2 of the workpiece W2 by the shoulder of the tip of the finishing end mill 40, and the finishing end mill 40 is moved away from the wing surface corresponding area P2 of the workpiece W2.

Note that instead of applying finishing processing to the ventral portion P2v of the wing surface corresponding area P2 of the workpiece W2 in the second finishing step (2-2), and applying finishing processing to the back portion P2b of the wing surface corresponding area P2 of the workpiece W2 in the third finishing step (2-3), finishing processing may be applied to the back portion P2b of the wing surface corresponding area P2 of the workpiece W2 in the second finishing step (2-2), and finishing processing may be applied to the ventral portion P2v of the wing surface corresponding, area P2 of the workpiece W2 in the third finishing step (2-3).

(Fourth Finishing Step (2-4))

After end of the third finishing step (2-3), the second finishing step (2-2) and the third finishing step (2-3) are alternately repeatedly executed, while giving pitch feed in a spanwise direction of the workpiece W2 to the finishing end mill 40, by driving the rotary motor, and performing feed-movement control and feed-rotation control of the finishing end mill 40 with respect to the workpiece W2 in the feed-movement axis directions and the feed-rotation axis directions. As a result of this, for each section L2A (L2B, L2C) of the wing surface corresponding area P2 of the workpiece W2, the ventral portion P2v and the back portion P2b of the wing surface corresponding area P2 of the workpiece W2 can be finished into a ventral portion S2v and a back portion S2b of the wing surface S2 of the wing wheel component member M2.

Subsequently, actions and effects of the embodiment will be explained.

After finishing of the leading edge S2a and the trailing edge S2t and finishing of the ventral portion S2v and the back portion S2b in the wing surface S2 of the wing wheel component member M2 are separated into separate steps, finishing processing is applied to the ventral portion P2v and the back portion P2b of the wing surface corresponding area P2 of the workpiece W2, respectively, and increasing and decreasing the speed of the finishing end mill 40 are performed while the finishing end mill 40 is away from the wing surface corresponding area P2 of the workpiece W2. Therefore, even if a relative feed-movement speed of the finishing end mill 40 becomes higher along with increase in the cutting speed of the finishing end mill 40, decrease in a relative feed amount per cutting edge due to change in direction of the finishing end mill 40 can be suppressed near the leading edge P2a and the trailing edge P2t of the wing surface corresponding area P2 of the workpiece W2.

In addition, the wing surface corresponding area P2 of the workpiece W2 is divided into the plurality of sections L2A, L2B, and L2C from the tip to the base end, and the series of steps including the first finishing step (2-1), the second finishing step (2-2), the third finishing step (2-3), and the fourth finishing step (2-4) is executed for each section L2A (L2B, L2C). Therefore, rapid deterioration of rigidity of the wing surface corresponding area P2 of the workpiece W2 in the middle of performing finishing processing thereof can be suppressed.

Accordingly, according to the embodiment, the effects similar to the above-mentioned first embodiment are exerted.

The present disclosure is not limited to the explanation of the above-mentioned embodiments, and can be carried out in various aspects. In addition, the scope of right embraced in the present disclosure also covers the wing members, such as the wing component M1 finished by the wing surface finishing method according to the first embodiment of the present disclosure, and the wing wheel component member M2 finished by the wing surface finishing method according to the second embodiment of the present disclosure.

What is claimed is:

1. A wing surface finishing method for applying finishing processing to a wing surface corresponding area of a roughly-processed workpiece, and finishing the wing surface corresponding area of the workpiece into a wing surface of a wing member, the wing surface finishing method comprising:

a first finishing step of applying finishing processing to a leading edge and a trailing edge of the wing surface corresponding area of the workpiece, and finishing the leading edge and trailing edge of the wing surface corresponding area of the workpiece into a leading edge and a trailing edge of the wing surface of the wing member, by giving infeed to a finishing end mill, and feeding and moving the finishing end mill relatively to the workpiece along the leading edge and the trailing edge of the wing surface corresponding area of the workpiece, while rotating the finishing end mill around an axial center thereof;

a second finishing step of applying finishing processing only to one of a ventral portion and a back portion of the wing surface corresponding area of the workpiece, and decreasing a speed of the finishing end mill after moving the finishing end mill away from the wing surface corresponding area of the workpiece, by giving infeed to the finishing end mill, making the finishing end mill approach the workpiece after increasing the speed of the finishing end mill, and feeding and moving the finishing end mill relatively to the workpiece along the one of the ventral portion and the back portion from a leading edge side or a trailing edge side of the wing surface corresponding area of the workpiece, while rotating the finishing end mill around the axial center thereof;

a third finishing step of applying finishing processing only to the other of the ventral portion and the back portion of the wing surface corresponding area of the workpiece, and decreasing the speed of the finishing end mill after moving the finishing end mill away from the wing surface corresponding area of the workpiece, by giving infeed to the finishing end mill, making the finishing end mill approach the workpiece after increasing the speed of the finishing end mill, and feeding and moving the finishing end mill relatively to the workpiece along the other of the ventral portion and the back portion from the trailing edge side or the leading edge side of the wing surface corresponding area of the workpiece, while rotating the finishing end mill around the axial center thereof, after end of the second finishing step; and a fourth finishing step of finishing the ventral portion and the back portion of the wing surface corresponding area of the workpiece into a ventral portion and a back portion of the wing surface of the wing member, by alternately repeatedly executing the second finishing step and the third finishing step while giving to the finishing end mill pitch feed in a spanwise direction of the wing surface corresponding area of the workpiece, after end of the third finishing step.

2. The wing surface finishing method according to claim 1, wherein the wing surface corresponding area of the workpiece is divided into a plurality of sections from a tip to a base end, and a series of steps including the first finishing step, the second finishing step, the third finishing step, and the fourth finishing step is executed in the plurality of sections.

* * * * *